(12) United States Patent
Tang et al.

(10) Patent No.: US 7,612,959 B2
(45) Date of Patent: Nov. 3, 2009

(54) METHOD FOR CORRECTING ADDED AND LOST BITS IN A HARD DISK DRIVE USING ERROR CORRECTION CODES

(75) Inventors: Yawshing Tang, Saratoga, CA (US); Carl Xiaodong Che, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 448 days.

(21) Appl. No.: 11/600,669

(22) Filed: Nov. 15, 2006

(65) Prior Publication Data

US 2008/0112071 A1 May 15, 2008

(51) Int. Cl.
*G11B 20/14* (2006.01)
(52) U.S. Cl. .......................... 360/40; 360/48
(58) Field of Classification Search ........................ None
See application file for complete search history.

(56) References Cited

U.S. PATENT DOCUMENTS 6,005,727 A * 12/1999 Behrens et al. ............... 360/48
6,115,198 A * 9/2000 Reed et al. .................... 360/46
6,167,550 A * 12/2000 Gray ............................ 714/769
2003/0007270 A1 * 1/2003 Bliss et al. .................... 360/46

OTHER PUBLICATIONS

H.C. Ferreira et al., Insertion/Delection Correction, IEEE Transactions on Information Theory, vol. 43, No. 2, Mar. 1997.
Eiichi Tanaka et al., Synchronization and Substitution Error-Correcting Codes for the Levenshtein Metric, IEEE Transactions on Information Theory, vol. IT22, No. 2, Mar. 1976.

* cited by examiner

*Primary Examiner*—Jason C Olson
(74) *Attorney, Agent, or Firm*—Ben J. Yorks; Irell & Manella LLP

(57) ABSTRACT

A hard disk drive with an encoder that writes data onto a disk in accordance with a plurality of first codes. Each code contains a plurality of digital bits. The first codes are selected so that if a bit is added or dropped during a write or read process the resulting bitstream can only be one of the selected first codes. This allows the bitstream to be accurately decoded to detect and correct for the added/dropped bit.

11 Claims, 5 Drawing Sheets

| RECEIVED DATA | POSSIBLE CODE WITH EITHER 0 OR 1 AS THE ADDED BIT |
|---|---|
| 0000 | |
| 0001 | |
| 0010 | |
| 0011 | |
| 0100 | |
| 0101 | |
| 0110 | |
| 0111 | |
| 1000 | |
| 1001 | |
| 1010 | |
| 1011 | |
| 1100 | |
| 1101 | |
| 1110 | |
| 1111 | |

FIG. 4A

| RECEIVED DATA | POSSIBLE CODE WITH EITHER 0 OR 1 AS THE ADDED BIT |
|---|---|
| 0000 | 000 |
| 0001 | 001, 000 |
| 0010 | 010, 000, 001 |
| 0011 | 011, 001 |
| 0100 | 000, 010 |
| 0101 | 001, 011, 010 |
| 0110 | 010, 011 |
| 0111 | 011 |
| 1000 | 100 |
| 1001 | 101, 100 |
| 1010 | 110, 100, 101 |
| 1011 | 111, 101 |
| 1100 | 100, 110 |
| 1101 | 101, 111, 110 |
| 1110 | 110, 111 |
| 1111 | 111 |

FIG. 4B

| RECEIVED DATA | POSSIBLE CODE WITH EITHER 0 OR 1 AS THE ADDED BIT |
|---|---|
| 0000 | ~~000~~ |
| 0001 | 001, ~~000~~ |
| 0010 | ~~010, 000,~~ 001 |
| 0011 | ~~011,~~ 001 |
| 0100 | ~~000, 010~~ |
| 0101 | 001, ~~011, 010~~ |
| 0110 | 010, 011 |
| 0111 | 011 |
| 1000 | 100 |
| 1001 | 101, 100 |
| 1010 | 110, 100, 101 |
| 1011 | 111, 101 |
| 1100 | 100, 110 |
| 1101 | 101, 111, 110 |
| 1110 | 110, 111 |
| 1111 | 111 |

FIG. 4C

| RECEIVED DATA | POSSIBLE CODE WITH EITHER 0 OR 1 AS THE ADDED BIT |
|---|---|
| 0000 | ~~000~~ |
| 0001 | 001, ~~000~~ |
| 0010 | ~~010, 000,~~ 001 |
| 0011 | ~~011,~~ 001 |
| 0100 | ~~000, 010~~ |
| 0101 | 001, 011, 010 |
| 0110 | ~~010, 011~~ |
| 0111 | ~~011~~ |
| 1000 | 100 |
| 1001 | ~~101,~~ 100 |
| 1010 | ~~110,~~ 100, ~~101~~ |
| 1011 | 111, 101 |
| 1100 | 100, ~~110~~ |
| 1101 | 101, 111, 110 |
| 1110 | 110, 111 |
| 1111 | 111 |

FIG. 4D

| RECEIVED DATA | POSSIBLE CODE WHERE ADDED BIT IS SAME AS THE PRECEDING BIT |
|---|---|
| 0000 | 000 |
| 0001 | 001 |
| 0010 | 010 |
| 0011 | 011, 001 |
| 0100 | 010 |
| 0101 | NONE |
| 0110 | 010 |
| 0111 | 011 |
| 1000 | 100 |
| 1001 | 100 |
| 1010 | NONE |
| 1011 | 101 |
| 1100 | 100, 110 |
| 1101 | 101 |
| 1110 | 110 |
| 1111 | 111 |

FIG. 5

METHOD FOR CORRECTING ADDED AND LOST BITS IN A HARD DISK DRIVE USING ERROR CORRECTION CODES

BACKGROUND OF THE INVENTION

1. Field of the Invention

The present invention relates to writing data onto a disk of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Data is stored on the disk as a series of ones and zeros. Each bit of data is typically written during an electronic timing window. A disk may be segmented into a plurality of individual magnetic areas. Each area is separated from an adjacent magnetic area by a non-magnetic space. Segmented disks can reduce the amount of magnetic interaction between magnetize areas of the disk. The difficulty with segmented disks is timing the writing to align with a magnetic area. For example, a head may write a bit when the write element is between two magnetic areas, causing magnetization of both areas. Such an event will create an additional bit in the bit stream.

It is difficult to detect such error bits because the read channel of the drive is continuously reading a stream of ones and zeros. Standard error correction techniques cannot typically account for added or dropped bits in a stream of data read from a disk. It would be desirable to detect and correct for added or dropped bits in a bitstream read from a disk of a hard drive.

BRIEF SUMMARY OF THE INVENTION

A hard disk drive with a circuit that encodes a series of bits into a plurality of first codes and writes the first codes onto a disk. The first codes have a sequence so that when one of a plurality of second codes is read back from the disk and includes an extra bit, the second code can only be one of the first codes.

BRIEF DESCRIPTION OF THE DRAWINGS

FIG. 4A-D are illustrations of a table used to derive a plurality of codes;

FIG. 5 is an illustration of a table with a number of selected and deselected code words.

DETAILED DESCRIPTION

Disclosed is a hard disk drive with an encoder that writes data onto a disk in accordance with a plurality of first codes. Each code contains a plurality of digital bits. The first codes are selected so that if a bit is added or dropped during a write or read process the resulting bitstream can only be one of the selected first codes. This allows the bitstream to be accurately decoded to detect and correct for the added/dropped bit.

Figure 1:
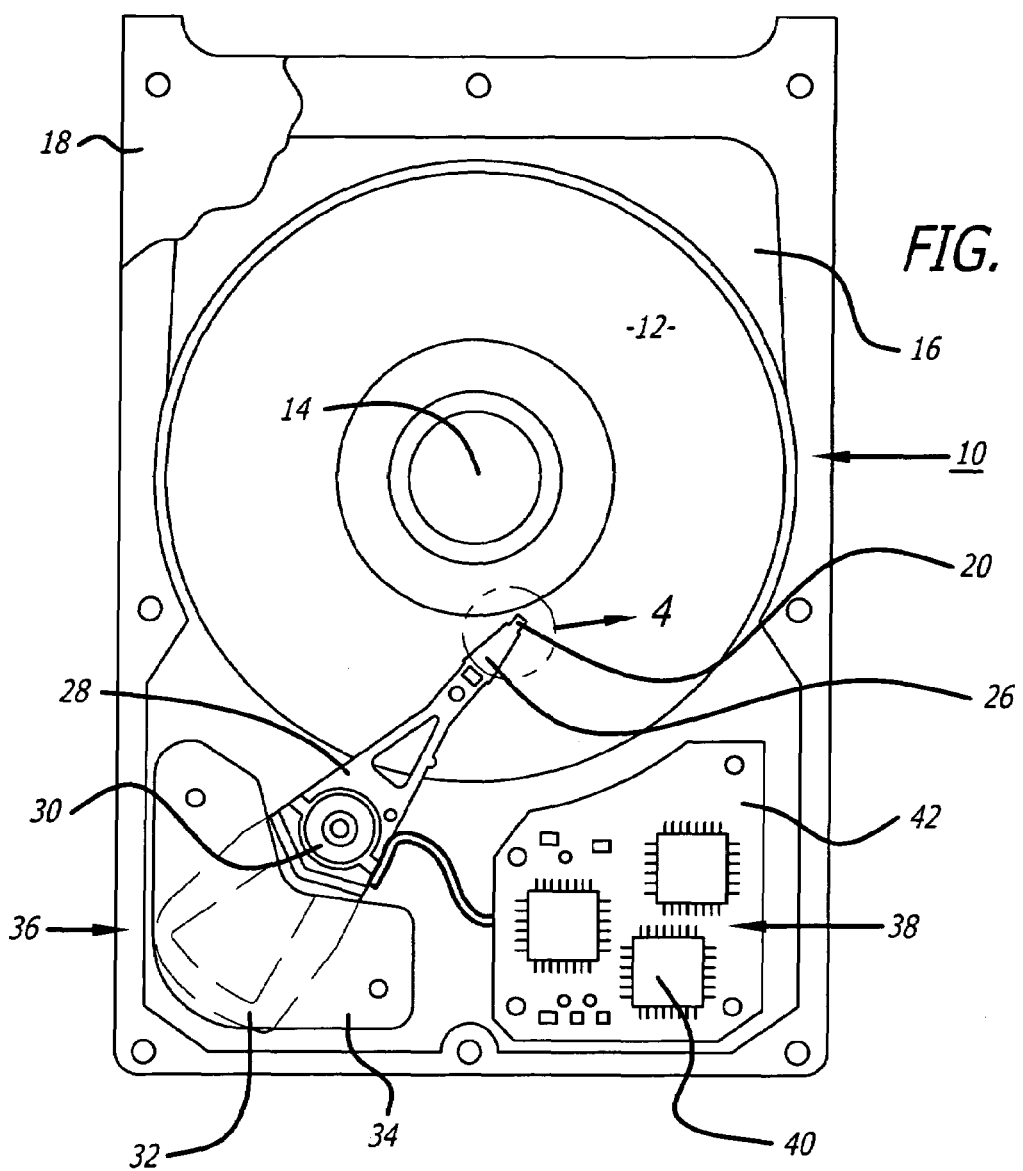
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
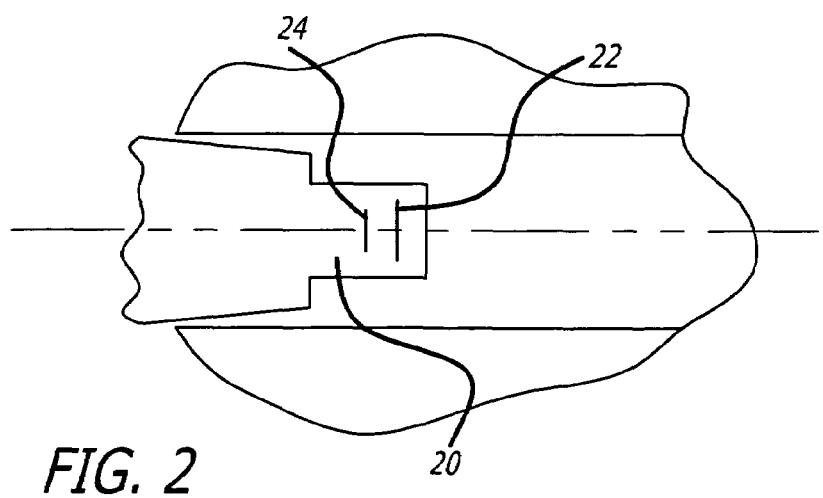
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
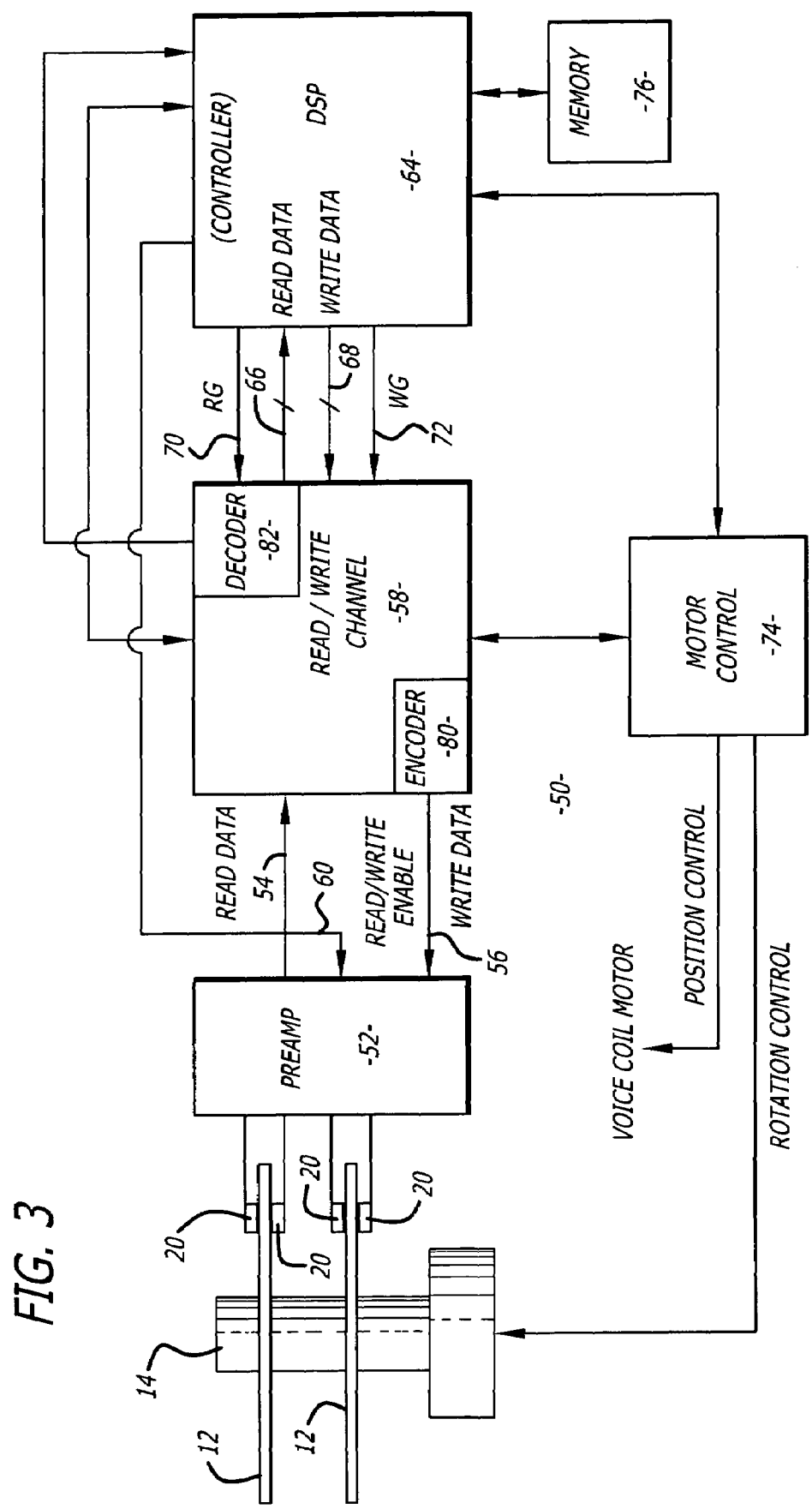
FIG. 3 is a schematic of an electrical circuit for the hard disk drive.

FIG. 3 shows an embodiment of an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

The write channel may include a encoder 80 that encodes the incoming data into a plurality of first codes. The encoder 80 may include a map that maps incoming bitstreams into outgoing bitstreams having a different binary pattern. The first codes are selected so that if a bit is added or dropped during the write or read process onto the disk, the resultant bitstream read from the disk will always include one of the first codes. The read channel has a decoder 82 that selects a first code word from a bitstream and maps the code back to the original bitstream.

The first codes can be selected with the following process. Assume the code words have N bits. First, there is generated a list of all possible N+1 code words. The +1 represents an error bit that was inadvertently added during a write or read process from the disk. FIG. 4A shows a table with a listing of all possibilities of N+1 ("Received Data") where N=3. The decoder 82 may have a counter or some other mechanism for determining whether a bit stream has an extra bit or a dropped bit.

Then as shown in FIG. 4B, place in an adjacent column the possible codes associated with each N+1 word, assuming a 0 or a 1 was inserted after the first bit. For example, for the code word 0001 there is a possibility that the 1 bit was added or that either the second or third 0 was added. Given this assumption then the possible code words are 001 or 000. Code words are listed next to associated N+1 code words.

Next a code word is selected and all rows with this code are noted and codes associated with these rows that are not the selected word are deselected and indicated by the cross-throughs in FIG. 4C. For example, the code word 001 may be selected. The codes in each row that includes 001 but are not 001 are deselected. For example, for the N+1 code word 0101 the code words 011 and 010 are deselected as shown in FIG. 4C. A new code word is selected and the process is repeated. For example, the code word 100 can be selected. Code words that are not 100 but are grouped with the word 100 are deselected as shown in FIG. 4D. For example, for the N+1 code 1010, the words 110 and 101 are deselected. The process continues until all possible code words are selected or deselected.

In this example, the code word 111 can be selected to complete the process. The selected codes are used as the first codes generated by the encoder 80. The deselected codes are not used by the encoder 80. Thus when a corrupted bitstream is read from the disk, there can only be one correct code word. For example, the read code 0011 is always decoded as 001, not 011. The first codes are decoded by the decoder 82 and then mapped back to the original bitstream.

FIG. 5 shows a number of selected and deselected code words assuming the added bit is the same as the preceding bit.

The technique shown in FIGS. 4A-D can be used with codes that drop a bit except the right hand column includes code words N−1 and the possible codes have an added bit.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk;
a spindle motor that rotates said disk;
a head coupled to said disk; and,
a circuit that encodes a series of bits into a plurality of first codes and writes said first codes onto said disk, said first codes having a sequence so that when one of a plurality of second codes is read back from said disk and includes an extra bit, said second code can only be one of said first codes, said first codes are derived by listing a plurality of possible codes that may be associated with said second codes, selecting a first code and then deselecting each possible code that can be associated with said first and second codes.

2. The disk drive of claim 1, wherein said first codes are selected based on a selection assuming that each extra bit equals a preceding bit.

3. The disk drive of claim 1, wherein said first codes each have 3 bits and each second code has 4 bits.

4. The disk drive of claim 1, wherein said circuit includes an encoder.

5. A hard disk drive, comprising:
a disk;
a spindle motor that rotates said disk;
a head coupled to said disk; and,
circuit means for encoding a series of bits into a plurality of first codes and writing said first codes onto said disk, said first codes having a sequence so that when one of a plurality of second codes is read back from said disk and includes an extra bit, said second code can only be one of said first codes, said first codes are derived by listing a plurality of possible codes that may be associated with said second codes, selecting a first code and then deselecting each possible code that can be associated with said first and second codes.

6. The disk drive of claim 5, wherein said first codes are selected based on a selection assuming that each extra bit equals a preceding bit.

7. The disk drive of claim 5, wherein said first codes each have 3 bits and each second code has 4 bits.

8. The disk drive of claim 5, wherein said circuit includes an encoder.

9. A method for controlling a read/write operation of a hard disk drive, comprising:
encoding a series of bits into a plurality of first codes;
writing the first codes onto a disk; and,
reading the first codes from the disk, the first codes having a sequence so that when one of a plurality of second codes is read back from the disk and includes an extra bit, the second code can only be one of the first codes, the first codes are derived by listing a plurality of possible codes that may be associated with the second codes, selecting a first code and then deselecting each possible code that can be associated with the first code.

10. The method of claim 9, wherein the first codes are selected based on a selection assuming that each extra bit equals a preceding bit.

11. The method of claim 9, wherein the first codes each have 3 bits and each second code has 4 bits.

* * * * *